United States Patent
Deng et al.

(10) Patent No.: US 11,909,035 B2
(45) Date of Patent: Feb. 20, 2024

(54) COMPOSITE NEGATIVE ELECTRODE MATERIAL FOR LITHIUM ION BATTERY, PREPARATION METHOD THEREOF, AND USE THEREOF IN LITHIUM ION BATTERY

(71) Applicant: BTR NEW MATERIAL GROUP CO., LTD., Shenzhen (CN)

(72) Inventors: Zhiqiang Deng, Shenzhen (CN); Chunlei Pang, Shenzhen (CN); Jianguo Ren, Shenzhen (CN); Youyuan Huang, Shenzhen (CN); Min Yue, Shenzhen (CN)

(73) Assignee: BTR NEW MATERIAL GROUP CO., LTD., Shenzhen (CN)

( * ) Notice: Subject to any disclaimer, the term of this patent is extended or adjusted under 35 U.S.C. 154(b) by 593 days.

(21) Appl. No.: 17/059,445

(22) PCT Filed: Feb. 18, 2019

(86) PCT No.: PCT/CN2019/075333
§ 371 (c)(1),
(2) Date: Nov. 29, 2020

(87) PCT Pub. No.: WO2019/227972
PCT Pub. Date: Dec. 5, 2019

(65) Prior Publication Data
US 2021/0159492 A1 May 27, 2021

(30) Foreign Application Priority Data
May 31, 2018 (CN) .......................... 201810551396.7

(51) Int. Cl.
*H01M 4/36* (2006.01)
*H01M 4/48* (2010.01)
(Continued)

(52) U.S. Cl.
CPC ........... *H01M 4/366* (2013.01); *H01M 4/483* (2013.01); *H01M 4/62* (2013.01);
(Continued)

(58) Field of Classification Search
None
See application file for complete search history.

(56) References Cited

U.S. PATENT DOCUMENTS

| 9,139,737 B1 | 9/2015 | Shah |
| 2015/0093636 A1* | 4/2015 | Delpuech ......... H01M 10/0569 429/188 |

(Continued)

FOREIGN PATENT DOCUMENTS

| CN | 105359309 A | 2/2016 |
| CN | 105917499 A | 8/2016 |

(Continued)

OTHER PUBLICATIONS

International Search Report from corresponding International Application No. PCT/CN2019/075333, dated Apr. 30, 2019, 4 pages including translation.

(Continued)

*Primary Examiner* — Wyatt P McConnell
(74) *Attorney, Agent, or Firm* — Tucker Ellis LLP

(57) ABSTRACT

The present application provides a composite negative electrode material of a lithium ion battery, a preparation method thereof and the use thereof in a lithium ion battery. The composite negative electrode material includes a $SiO_x$-based active material and a polycarbonate coating layer coated on a surface of the $SiO_x$-based active material. The method includes: (1) preparing a monomer solution of unsaturated carbonate; (2) polymerizing the monomer in presence of a polymerization catalyst to obtain a polymer solution; and (3) adding a $SiO_x$-based active material, water and a polymer (Continued)

catalyst to the polymer solution, and further polymerizing to coat the $SiO_x$-based active material, to obtain the composite negative electrode material.

19 Claims, 2 Drawing Sheets

(51) Int. Cl.
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2015/0287989 A1 | 10/2015 | Hirose | |
| 2016/0164081 A1 | 6/2016 | Cui | |
| 2017/0040599 A1* | 2/2017 | Kamo | H01M 4/622 |

FOREIGN PATENT DOCUMENTS

| | | |
|---|---|---|
| CN | 105993088 A | 10/2016 |
| CN | 106129347 A | 11/2016 |
| CN | 106252596 A | 12/2016 |
| CN | 108063229 A | 5/2018 |
| CN | 108682824 A | 10/2018 |
| EP | 3096379 A1 | 11/2016 |
| JP | 2015156328 A | 8/2015 |
| KR | 101586816 B1 | 1/2016 |
| KR | 20160110380 A | 9/2016 |
| KR | 20190030676 A | 3/2019 |
| WO | 2013047024 A1 | 4/2013 |
| WO | 2013156888 A1 | 10/2013 |

OTHER PUBLICATIONS

First Office Action from corresponding Chinese Application No. 2018105949389, Oct. 10, 2020, 11 pages including translation.
First Office Action from corresponding Chinese Application No. 201810551396.7, dated Sep. 23, 2020, 8 pages with translation.
Second Office Action from corresponding Chinese Application No. 201810551396.7, dated May 14, 2021, 9 pages with translation.
Third Office Action from corresponding Chinese Application No. 201810551396.7, dated Sep. 29, 2021, 8 pages with translation.
Supplementary European Search Report from corresponding European 19811058; dated Oct. 13, 2021; 28 pages.
Japanese Office Action from corresponding Japanese Application No. 2021-508042; dated Oct. 4, 2021; 5 pages with translation.
Notice of Allowance of Japanese Application No. 2021-508042; dated Jun. 6, 2022, 5 pages with translation.
Notice of Allowance for the corresponding Korean Application No. 10-2020-7032531, dated Jun. 26, 2023; 10 pages with translation.
Office Action for the corresponding Korean Application No. 10-2020-7032531, dated Oct. 26, 2022; 16 pages with translation.

* cited by examiner

COMPOSITE NEGATIVE ELECTRODE MATERIAL FOR LITHIUM ION BATTERY, PREPARATION METHOD THEREOF, AND USE THEREOF IN LITHIUM ION BATTERY

FIELD

The present application relates to the field of lithium ion batteries, for example, to a composite negative electrode material of lithium ion batteries, a preparation method thereof, and use thereof in lithium ion batteries.

BACKGROUND

In order to improve the energy density of lithium-ion batteries, a huge amount of exploratory researches has been carried out on the development of high-capacity negative electrodes in the past two decades. Silicon has become the current research hotspot of the negative electrode material of the lithium ion batteries, due to its characteristics such as highest theoretical specific capacity, abundant sources, low price, and environmental friendliness. However, due to the severe volume effect, the cycle performance of silicon-based materials is very poor, which cannot meet the requirements for commercial applications. The $SiO_x$ material has received extensive attention and research, as it has high capacity and better cycle performance than elemental silicon. However, its cycle performance is still incomparable to graphite, and thus the $SiO_x$ material cannot satisfy the commercial requirements. Therefore, it is a technical problem in the related art to develop a $SiO_x$-based negative electrode material with excellent cycle performance and low volume expansion effect.

One of the main factors leading to the cycle stability problem of the $SiO_x$-based material is that the solid electrolyte interface film (SEI film) is repeatedly destructed and reconstructed. In this regard, it is necessary to provide a new type of composite negative electrode material, which is essentially involved in the formation of SEI film to form a more stable and improved SEI film, avoiding the repeated destruction and reconstruction thereof, and ultimately improving the cycle performance of the lithium ion battery and prolonging the service life of the lithium ion battery.

SUMMARY

The following is a summary of subject matters described in detail in the present application. The summary is not intended to limit the protection scope of the claims.

An object of the present application is to provide a composite negative electrode material, a preparation method thereof and use thereof in a lithium ion battery.

The composite negative electrode material of the present application can essentially participate in the formation of the SEI film to form a more stable and improved SEI film, avoiding the repeated destruction and reconstruction thereof, and ultimately improving the cycle performance of the lithium ion battery and prolonging the service life of the lithium ion battery.

For the above object, the present application adopts the following technical solutions.

In a first aspect, the present application provides a composite negative electrode material of a lithium ion battery, and the composite negative electrode material includes a $SiO_x$-based active material and a polycarbonate coating layer coated on a surface of the $SiO_x$-based active material.

In the composite negative electrode material according to the present application, polycarbonate firmly coated on the surface of the $SiO_x$-based active material protects the $SiO_x$-based active material while participating in the formation of the SEI film during a charging and discharging process of the $SiO_x$-based active material. In this way, the polycarbonate component having high molecular weight in the SEI film is increased, which increases a toughness of the SEI film and improves the stability of the SEI film, thereby avoiding the repeated destruction and reconstruction thereof, and ultimately improving the cycle performance of the lithium ion battery.

The polycarbonate according to the present application cannot be replaced by other resins, since the polycarbonate can match the composition of the existing electrolyte and participate in reactions for forming the SEI film, while other types of resins cannot achieve such effects.

As an optional technical solution of the composite negative electrode material according to the present application, the $SiO_x$-based active material has a particle size ranging from 0.5 μm to 100 μm, for example 0.5 μm, 1 μm, 3 μm, 6 μm, 10 μm, 15 μm, 20 μm, 30 μm, 40 μm, 45 μm, 50 μm, 60 μm, 70 μm, 80 μm, 90 μm, 100 μm, etc., and optionally from 5 μm to 50 μm.

Optionally, the $SiO_x$-based active material is selected from the group consisting of $SiO_x$, $SiO_x/C$, $SiO_x/M$, and combinations thereof, where M is selected from the group consisting of alkali metal, alkaline earth metal, alkali metal oxide, alkaline earth metal oxide, and combinations thereof, and $0<x\leq2$.

In the present application, "$SiO_x/C$" refers to a composite of $SiO_x$ and C, and "$SiO_x/M$" refers to a composite of $SiO_x$ and M.

Optionally, the polycarbonate coating layer has a thickness in a range of 10 nm to 100 nm, for example, 10 nm, 20 nm, 30 nm, 40 nm, 50 nm, 60 nm, 70 nm, 80 nm, 85 nm, or 100 nm, etc. If the thickness is less than 10 nm, the coating layer is likely to be damaged; and if the thickness is greater than 100 nm, the electronic conduction of the material will be influenced. An optional range is 20 nm to 50 nm.

Optionally, based on 100% of a total mass of the $SiO_x$-based active material, a mass percentage of the polycarbonate coating layer ranges from 0% to 10% excluding 0%, for example, 0.5%, 1%, 2%, 2.5%, 3%, 4%, 6%, 6.5%, 7%, 8%, 9%, or 10%, etc., optionally 3% to 7%. In the optional range of 3% to 7%, a coating layer with a more appropriate thickness can be formed on the $SiO_x$-based active material to improve the electrochemical performance in a better way.

Optionally, the polycarbonate coating layer is formed by polymerizing unsaturated carbonate, and the unsaturated carbonate has a structural formula of:

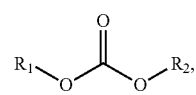

wherein at least one of $R_1$ and $R_2$ is an unsaturated group containing a carbon-carbon double bond or a carbon-carbon triple bond, and if only one of $R_1$ and $R_2$ is the unsaturated group containing a carbon-carbon double bond or a carbon-carbon triple bond, the other one of $R_1$ and $R_2$ is any one of H, alkyl, or an aromatic group.

In the present application, the $SiO_x$-based active material and the polycarbonate coating layer are directly connected to each other; or the $SiO_x$-based active material and the polycarbonate coating layer are connected to each other by an unsaturated silane coupling agent.

The composite negative electrode material according to the present application has an optional structure in which the $SiO_x$-based active material and the polycarbonate coating layer are connected to each other by an unsaturated silane coupling agent, to form the composite negative electrode material. By means of the connection through the silane coupling agent, the polycarbonate coating layer can be more stable and strong, such that the SEI formed with the participation of the polycarbonate is less likely to detach from the surface of the material, and ultimately the battery cycle performance is better.

Optionally, the unsaturated silane coupling agent has a structural formula of:

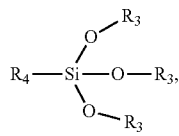

wherein $R_3$ is alkyl having 1 to 6 carbon atoms, and $R_4$ is an unsaturated group containing a carbon-carbon double bond or a carbon-carbon triple bond.

Optionally, based on 100% of the total mass of the $SiO_x$-based active material, a mass percentage of the unsaturated silane coupling agent ranges from 0% to 5%, for example, 0%, 0.5%, 1%, 1.5%, 2%, 2.5%, 3%, 3.2%, 3.6%, 4%, or 5%, etc., optionally from 1% to 3%. "a mass percentage of 0%" indicates the absence of the unsaturated silane coupling agent.

In a second aspect, the present application provides a preparation method of the composite negative electrode material according to the first aspect. The method includes:

step 1 of preparing a monomer solution of unsaturated carbonate;

step 2 of polymerizing the monomer in presence of a polymerization catalyst to obtain a polymer solution; and step 3 of adding the $SiO_x$-based active material, water and a polymer catalyst to the polymer solution, and further performing polymerizing to coat the $SiO_x$-based active material, to obtain the composite negative electrode material.

In the method according to the present application, the unsaturated carbonate is first pre-polymerized, and then the $SiO_x$-based active material is dispersed therein. The unsaturated carbonate is in-situ coated on the surface of the $SiO_x$-based active material while being polymerized, such that the obtained $SiO_x$-based active material is finally coated with a polycarbonate layer with high molecular weight.

Moreover, the preparation method according to the present application is simple, efficient, cost-effective, and easy for industrialization and environmental in the production process.

As an optional technical solution of the method according to the present application, after the coating in the step 3 is completed, the method further includes a step of performing solid separation and drying.

The solid separation is not specifically limited in the present application, for example, the solid separation may be atmospheric pressure filtration, reduced pressure filtration centrifugation, or the like.

Optionally, the drying is performed at a temperature of 80° C. to 150° C., for example, 80° C., 90° C., 95° C., 100° C., 110° C., 115° C., 120° C., 130° C., 140° C., or 150° C., etc.

Optionally, the drying is performed for a time period of 2 h to 12 h, for example, 2 h, 4 h, 6 h, 7 h, 8 h, 10 h, 11 h, or 12 h, etc.

As an optional technical solution of the method according to the present application, the step 1 includes: dissolving the unsaturated carbonate in a solvent; or dissolving the unsaturated carbonate and an unsaturated silane coupling agent in a solvent.

Optionally, the step 1 includes: dissolving the unsaturated carbonate and the unsaturated silane coupling agent in the solvent. In such an optional case, during the polymerization of the unsaturated carbonate, the unsaturated silane coupling agent is added for co-polymerization, and the silane coupling agent is respectively connected to the polycarbonate and the $SiO_x$-based active material through covalent bonds therebetween, so that the polycarbonate is more firmly coated on the surface of the $SiO_x$-based active material, better protecting the active material.

Optionally, in the step 1, the solvent is selected from the group consisting of water, methanol, ethanol, polypyrrolidone, isopropanol, tetrahydrofuran, ethyl acetate, N,N-dimethylacetamide, N,N-dimethylformamide, n-hexane, halogenated hydrocarbon, and combinations thereof, and optionally selected from the group consisting of ethanol, polypyrrolidone, isopropanol, tetrahydrofuran, ethyl acetate, N,N-dimethylformamide, and combinations thereof.

Optionally, in the step 1, a concentration of the unsaturated carbonate in the monomer solution ranges from 5 wt % to 10 wt %, for example, 5 wt %, 6 wt %, 7 wt %, 8 wt %, 8.5 wt %, 9 wt %, or 10 wt %, etc.

Optionally, in the step 1, a mass ratio of the unsaturated carbonate to the unsaturated silane coupling agent ranges from 2:1 to 7:1, for example, 2:1, 3:1, 4:1, 5:1, 6:1, 6.5:1, or 7:1, etc.

Optionally, the polymerization catalyst in the step 2 and the polymer catalyst in the step 3 are each independently selected from the group consisting of potassium persulfate, sodium persulfate, ammonium persulfate, dibenzoyl peroxide, and 2,2'-azobis(2-methylpropionitrile).

Optionally, a total polymerization time of the step 2 and the step 3 ranges from 2 h to 10 h, for example, 2 h, 3.5 h, 4.5 h, 6 h, 8 h, or 10 h, etc.

Optionally, the polymerizing in the step 2 and the polymerizing in the step 3 are each independently performed at a temperature of 50° C. to 100° C., for example, 50° C., 60° C., 70° C., 80° C., 85° C., 90° C., or 100° C., etc.

As an optional technical solution of the method according to the present application, the method includes the following steps:

(1) dissolving the unsaturated carbonate and the unsaturated silane coupling agent in the solvent to prepare the monomer solution of the unsaturated carbonate;

(2) polymerizing the monomer at 50° C. to 100° C. in the presence of the polymerization catalyst to obtain the polymer solution;

(3) adding the $SiO_x$-based active material, water and the polymer catalyst into the polymer solution, and further performing polymerizing at 50° C. to 100° C. to coat the $SiO_x$-based active material; and (4) performing solid separation, and drying at 80° C. to 150° C. for 2 hours to 12 hours, to obtain the composite negative electrode material.

In a third aspect, the present application provides a negative electrode, and the negative electrode includes the composite negative electrode material according to the first aspect.

In a fourth aspect, the present application provides a lithium ion battery, and the lithium ion battery includes the negative electrode according to the third aspect.

Compared with the related art, the present application has the following beneficial effects.

(1) In the composite negative electrode material having the polycarbonate coating according to the according to the present application, the polycarbonate is firmly coated on the surface of the $SiO_x$-based active material to protect the $SiO_x$-based active material while participating in the formation of the SEI film during the charging and discharging process of the $SiO_x$-based active material. In this way, the high molecular weight polycarbonate component in the SEI film is increased, which increases the toughness of the SEI film and improves the stability of the SEI film, thereby avoiding the repeated destruction and reconstruction thereof, and ultimately improving the cycle performance of the lithium ion battery.

When the composite negative electrode material according to the present application is used as a negative electrode material in a lithium ion battery, due to the introduction of an appropriate amount of the polycarbonate coating layer, the battery can exhibit excellent electrochemical cycle performance and low expansion performance, thereby prolonging the service life of the lithium ion battery.

(2) The preparation method according to the present application adopts cheap raw materials, has simple process and mild conditions, require less on equipment, and is cost-effective. Moreover, no toxic and harmful intermediate products are produced during the preparation process, and thus the production process is green, environmentally friendly, and suitable for mass-production.

Other aspects will be clear upon reading and understanding the detailed description with reference to accompanying drawings.

DESCRIPTION OF EMBODIMENTS

Figure 1:
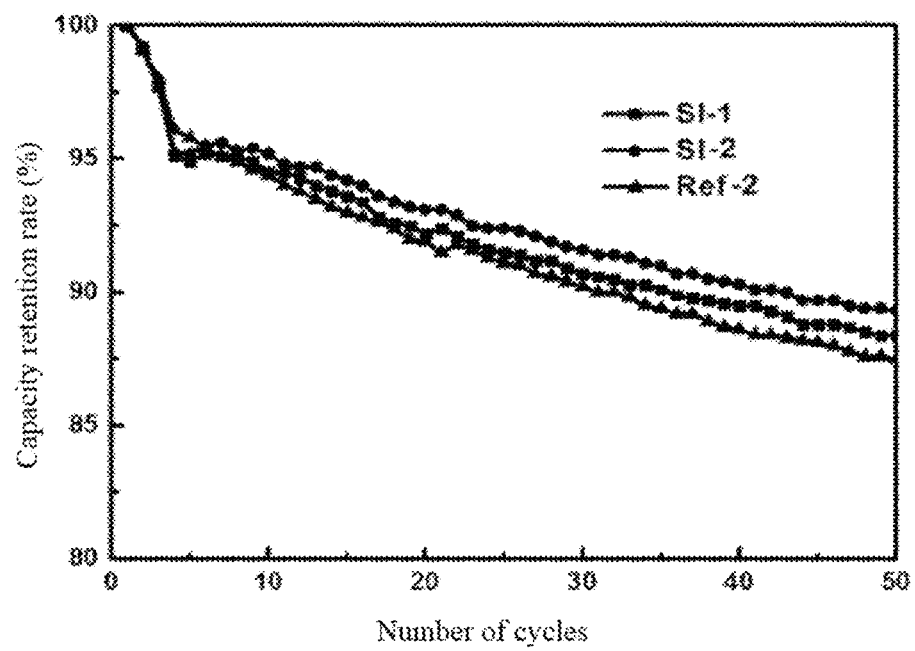
FIG. 1 is a comparison diagram of 50-cycle cycle performance test results of SI-1, SI-2 and Ref-2.

In order to clearly explain the object, the technical solutions and technical effects of the present application, the present application is described in detail with reference to specific examples and drawings.

Example 1

5 g of vinylene carbonate was dissolved in 100 ml of ethyl acetate, heated to 70° C., then added with 0.2 g of ammonium persulfate, and stirred to react for 1 hour. Then, 100 g of $SiO_x$ (x=1), 0.2 g of ammonium persulfate and 5 g of water were added, reacted for 4 hours, and then cooled. The solid material was separated by suction filtration, then placed in a drying oven for heat treatment at 80° C. for 8 hours, and cooled to obtain a corresponding composite negative electrode material coated with polycarbonate.

Example 2

5 g of vinylene carbonate and 2 g of vinyltrimethoxysilane were dissolved in 100 ml of ethyl acetate, heated to 70° C., then added with 0.2 g of ammonium persulfate, and stirred to react for 1 hour. Then, 100 g of $SiO_x$ (x=1), 0.2 g ammonium persulfate and 5 g of water were added, reacted for 4 hours, and then cooled. The solid material was separated by suction filtration, then placed in a drying oven for heat treatment at 100° C. for 8 hours, and cooled to obtain a corresponding composite negative electrode material coated with polycarbonate.

Example 3

7 g of vinyl ethylene carbonate was dissolved in 100 ml of N,N-dimethylformamide, heated to 85° C., then added with 0.2 g of sodium persulfate, and stirred to react for 2 hours. Then, 100 g of $SiO_x$ (x=1.5), 2 g of water and 0.2 g of potassium persulfate were added, reacted for 6 hours, and then cooled. The solid material was separated by suction filtration, then placed in a drying oven for heat treatment at 80° C. for 12 hours, and cooled to obtain a corresponding composite negative electrode material coated with polycarbonate.

Example 4

7 g of vinyl ethylene carbonate and 1 g of vinyltriethoxysilane were dissolved in 100 ml of N,N-dimethylformamide, heated to 100° C., then added with 0.2 g of dibenzoyl peroxide, and stirred to react for 1 hours. Then, 100 g of $SiO_x/C$ (x=1), 10 g of water and 0.3 g of dibenzoyl peroxide were added, reacted for 7 hours, and then cooled. The solid material was separated by suction filtration, then placed in a drying oven for heat treatment at 120° C. for 3 hours, and cooled to obtain a corresponding composite negative electrode material coated with polycarbonate.

Example 5

10 g of propenyl phenyl carbonate was dissolved in 100 ml of polypyrrolidone, heated to 65° C., then added with 0.5 g of potassium persulfate, and stirred to react for 3.5 hours. Then, 100 g of $SiO_x/Mg$ (x=1.5), 2 g of water and 0.2 g of potassium persulfate were added, reacted for 4.5 hours, and then cooled. The solid material was separated by suction filtration, then placed in a drying oven for heat treatment at 135° C. for 4.5 hours, and cooled to obtain a corresponding composite negative electrode material coated with polycarbonate.

Tests

The negative electrode materials prepared in Examples 1-5 were applied to lithium ion batteries respectively numbered SI-1, SI-2, SI-3, SI-4, and SI-5. As reference groups, lithium ion batteries numbered Ref-1 and Ref-2 and prepared by respectively using SiO and SiO/C (x=1.0) as negative electrode materials, and lithium-ion batteries numbered Ref-3 and Ref-4 and prepared respectively by using phenolic resin-coated SiO and epoxy resin-coated SiO as negative electrode materials were used.

Each of the negative electrode materials prepared in the above Examples 1-5 and the negative electrode materials corresponding to Ref-1 to Ref-4 was mixed with sodium carboxymethyl cellulose, styrene butadiene rubber, conductive graphite (KS-6) and carbon black (SP) according to a ratio of 92:2:2:2:2 to prepare a slurry, which was then evenly coated on a copper foil and dried to form a negative electrode plate. The negative electrode plate was assembled to a button cell in a glove box with an argon atmosphere. The separator was a microporous polypropylene membrane, the electrolytic solution was 1 mol/L lithium hexafluorophosphate (the solvent was a mixed solution of ethylene carbonate, ethyl methyl carbonate, and dimethyl carbonate), and the counter electrode plate was a metal lithium plate.

The above batteries were subjected to cycle test with Land battery test system CT2001C at a test temperature of 25° C. and a voltage range of 0.005V to 1.5V, charging and discharging for 50 cycles at a current density of 1 C. After the cycle test, the capacity retention rates were calculated, and the lithium ion batteries were disassembled to measure the thickness of the negative electrode plate. The capacity retention rate after 50 cycles=$50^{th}$ cycle discharge capacity/$1^{st}$ cycle discharge capacity*100%, and the results are shown in Table 1; the expansion rate of the negative electrode plate after 50 cycles=(thickness after $50^{th}$ cycle−thickness of uncharged electrode plate)/thickness of uncharged electrode plate*100%, and the results are shown in Table 1.

FIG. 1 is a comparison diagram of 50-cycle cycle performance test results of SI-1, SI-2 and Ref-2.

Figure 2A:
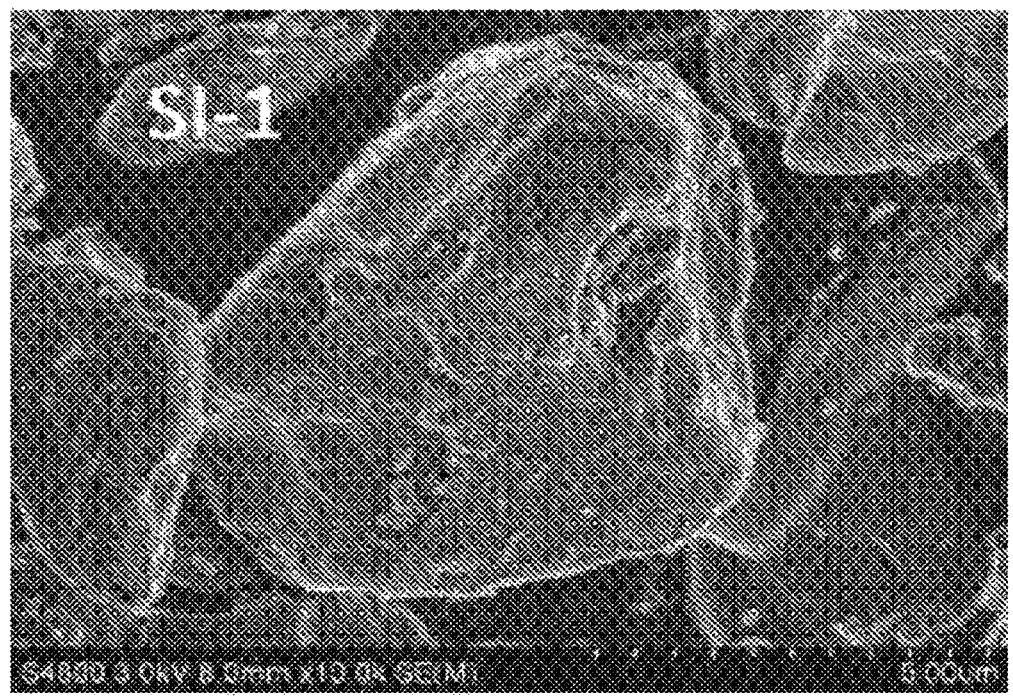
FIG. 2a and FIG. 2b are SEM images of negative electrode materials of SI-1 and SI-2, respectively.
Figure 2B:
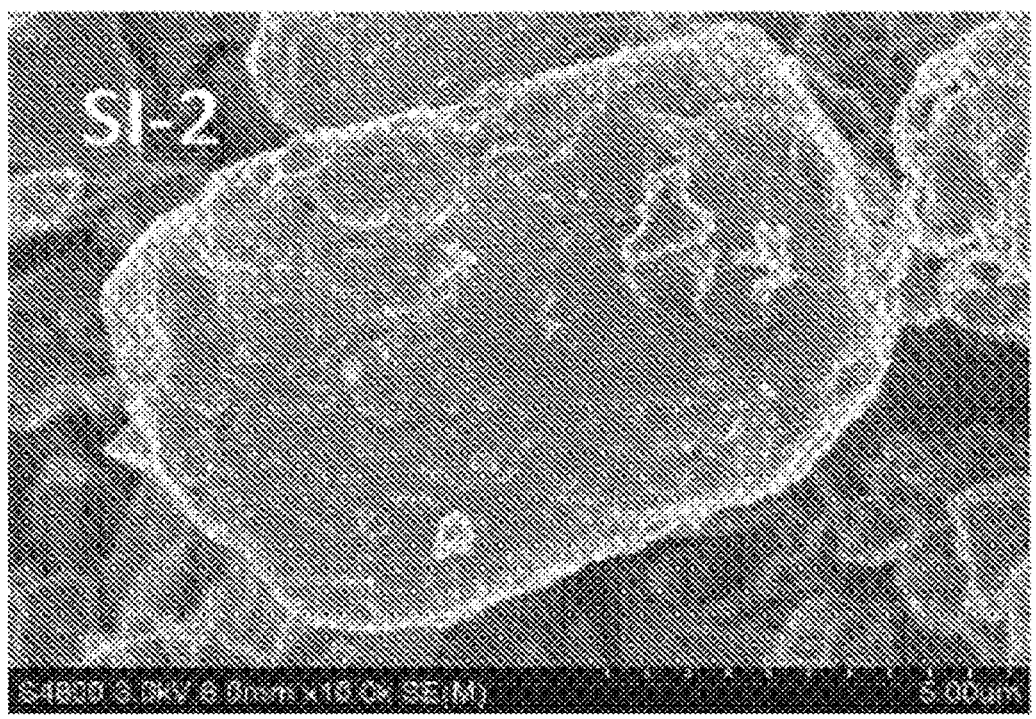

FIG. 2a and FIG. 2b are SEM images of negative electrode materials of SI-1 and SI-2, respectively.

TABLE 1 capacity retention rates and electrode plate expansion rates of respective batteries after 50 cycles

| Example | No. | Capacity retention rate after 50 cycles (%) | Electrode plate expansion rate after 50 cycles (%) |
| --- | --- | --- | --- |
| Example 1 | SI-1 | 88.4 | 36.5 |
| Example 2 | SI-2 | 89.3 | 36.1 |
| Example 3 | SI-3 | 87.8 | 38.2 |
| Example 4 | SI-4 | 90.7 | 35.5 |
| Example 5 | SI-5 | 86.6 | 36.4 |
| Reference group | Ref-1 | 82.6 | 40.7 |
| Reference group | Ref-2 | 87.5 | 38.5 |
| Reference group | Ref-3 | 79.8 | 43.2 |
| Reference group | Ref-4 | 78.1 | 45.4 |

From the test results in Table 1, it can be found that the batteries using the $SiO_x$-based material according to the present application as a negative electrode active material had significantly improved capacity retention rates and significantly reduced electrode plate expansion rates after 50 cycles, while the reference groups not using the negative electrode active materials prepared according to the present application had inferior effects compared to the examples. Reference groups Ref-1, Ref-3, and Ref-4 differ from Example SI-1 merely in the surface coating layer of the $SiO_x$-based material. In SI-1, the surface of the $SiO_x$-based material has the polycarbonate coating layer, and the battery cycle performance is significantly better than the three Reference groups. The improvement of the battery cycle performance is attributed to the improving effect of the polycarbonate coating layer. In contrast, the phenolic resin coating and the epoxy resin coating in Reference groups Ref-3 and Ref-4 even deteriorate the battery cycle performance, because the phenolic resin and epoxy resin cannot participate in the construction of SEI film on the surface of the $SiO_x$-based material as polycarbonate do to improve the stability of SEI, and their presences negatively affect the electron conduction of the material and the formation of SEI film on the surface of the material, thus deteriorating the battery cycle performance.

The above embodiments are for the purpose of describing the detailed methods of the present application, but the present application is not limited to the detailed methods, i.e., the present application is unnecessarily implemented according to the above detailed methods. Those skilled in the art shall understand that the embodiments described in the description are intended to explain the present application. Specific substances, formulation ratios and reaction conditions mentioned above are some specific embodiments of the substances, formulation ratios and reactions of the present application, but not intended to further limit the present application.

What is claimed is:

1. A composite negative electrode material of a lithium ion battery, comprising a $SiO_x$-based active material and a polycarbonate coating layer coated on a surface of the $SiO_x$-based active material, wherein 0<x≤2, wherein the $SiO_x$-based active material has a particle size ranging from larger than 20 μm to 100 μm or less, and wherein the $SiO_x$-based active material and the polycarbonate coating layer are connected to each other by an unsaturated silane coupling agent.

2. The composite negative electrode material according to claim 1, wherein the polycarbonate coating layer has a thickness ranging from 10 nm to 100 nm.

3. The composite negative electrode material according to claim 1, wherein, based on 100% of a total mass of the $SiO_x$-based active material, a mass percentage of the polycarbonate coating layer ranges from 0% to 10% excluding 0%.

4. The composite negative electrode material according to claim 1, wherein the $SiO_x$-based active material has a particle size ranging from 30 μm to 50 μm.

5. The composite negative electrode material according to claim 1, wherein the polycarbonate coating layer is formed by polymerizing unsaturated carbonate, and the unsaturated carbonate has a structural formula of:

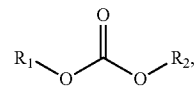

where at least one of $R_1$ and $R_2$ is an unsaturated group containing a carbon-carbon double bond or a carbon-carbon triple bond, and if only one of $R_1$ and $R_2$ is the unsaturated group containing a carbon-carbon double bond or a carbon-carbon triple bond, the other one of $R_1$ and $R_2$ is any one of H, alkyl, or an aromatic group.

6. A preparation method of the composite negative electrode material according to claim 1, comprising:
step 1 of preparing a monomer solution of unsaturated carbonate;
step 2 of polymerizing the monomer in presence of a polymerization catalyst to obtain a polymer solution; and
step 3 of adding the $SiO_x$-based active material, water and a polymer catalyst to the polymer solution, and further performing polymerizing to coat the $SiO_x$-based active material, to obtain the composite negative electrode material.

7. The method according to claim 6, further comprising a step of performing solid separation and drying, after the coating in the step 3 is completed.

8. The method according to claim 6, wherein the step 1 comprises: dissolving the unsaturated carbonate and an unsaturated silane coupling agent in a solvent.

9. The method according to claim 8, wherein in the step 1, the solvent is selected from the group consisting of water, methanol, ethanol, polypyrrolidone, isopropanol, tetrahydrofuran, ethyl acetate, N,N-dimethylacetamide, N,N-dimethylformamide, n-hexane, halogenated hydrocarbon, and combinations thereof, optionally selected from the group consisting of ethanol, polypyrrolidone, isopropanol, tetrahydrofuran, ethyl acetate, N,N-dimethylformamide, and combinations thereof.

10. The method according to claim 6, wherein the method comprises the following steps:
dissolving the unsaturated carbonate and an unsaturated silane coupling agent in a solvent to prepare the monomer solution of the unsaturated carbonate;
polymerizing the monomer at 50° C. to 100° C. in the presence of the polymerization catalyst to obtain the polymer solution;
adding the $SiO_x$-based active material, water and the polymer catalyst into the polymer solution, and further performing polymerizing at 50° C. to 100° C. to coat the $SiO_x$-based active material; and
performing solid separation, and drying at 80° C. to 150° C. for 2 hours to 12 hours, to obtain the composite negative electrode material.

11. A negative electrode, comprising the composite negative electrode material according to claim 1.

12. A lithium ion battery, comprising the negative electrode according to claim 11.

13. The composite negative electrode material according to claim 1, wherein the $SiO_x$-based active material is selected from the group consisting of $SiO_x$, $SiO_x/C$, $SiO_x/M$, and combinations thereof, where M is selected from the group consisting of alkali metal, alkaline earth metal, alkali metal oxide, alkaline earth metal oxide, and combinations thereof, and $0<x\leq2$.

14. The composite negative electrode material according to claim 1, wherein the unsaturated silane coupling agent has a structural formula of:

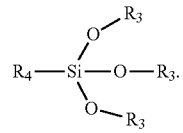

where $R_3$ is alkyl having 1 to 6 carbon atoms, and $R_4$ is an unsaturated group containing a carbon-carbon double bond or a carbon-carbon triple bond.

15. The composite negative electrode material according to claim 1, wherein based on 100% of a total mass of the $SiO_x$-based active material, a mass percentage of the unsaturated silane coupling agent ranges from 0% to 5%.

16. The method according to claim 6, wherein in the step 1, a concentration of the unsaturated carbonate in the monomer solution ranges from 5 wt % to 10 wt %.

17. The method according to claim 8, wherein in the step 1, a mass ratio of the unsaturated carbonate to the unsaturated silane coupling agent ranges from 2:1 to 7:1.

18. The method according to claim 6, wherein the polymerization catalyst in the step 2 and the polymer catalyst in the step 3 are each independently selected from the group consisting of potassium persulfate, sodium persulfate, ammonium persulfate, dibenzoyl peroxide, and 2,2'-azobis (2-methylpropionitrile).

19. The method according to claim 6, wherein a total polymerization time of the step 2 and the step 3 ranges from 2 hours to 10 hours; and the polymerizing in the step 2 and the polymerizing in the step 3 are each independently performed at a temperature of 50° C. to 100° C.

* * * * *